United States Patent [19]

Linder et al.

[11] 4,412,446
[45] Nov. 1, 1983

[54] OPTICAL COMBUSTION SENSOR, PARTICULARLY FOR USE WITH INTERNAL COMBUSTION ENGINES

[75] Inventors: Ernst Linder, Mühlacker; Helmut Maurer, Vaihingen; Klaus Müller, Tamm; Helmut Reum, Stuttgart, all of Fed. Rep. of Germany

[73] Assignee: Robert Bosch GmbH, Stuttgart, Fed. Rep. of Germany

[21] Appl. No.: 344,408

[22] Filed: Feb. 1, 1982

[30] Foreign Application Priority Data

Mar. 20, 1981 [DE] Fed. Rep. of Germany ....... 3110996

[51] Int. Cl.³ ............................................. G01L 23/22
[52] U.S. Cl. ........................................ 73/35; 313/129
[58] Field of Search ................... 73/35; 123/425, 435; 313/129, 116

[56] References Cited

U.S. PATENT DOCUMENTS 2,841,979  7/1958  Harbert .................................. 73/35
3,517,247  6/1970  Szilagyi ............................. 73/35 X

*Primary Examiner*—James J. Gill
*Attorney, Agent, or Firm*—Frishauf, Holtz, Goodman & Woodward

[57] ABSTRACT

To provide for improved cleaning of an optical combustion sensor, particularly to determine knocking in an internal combustion (IC) engine, a pick-up element made of glass, glass-coated or covered metal or the like, and, for example, hollow inside and filled with a vaporizable and condensable medium to define a heat pipe, has a sensing end portion which is formed with a mushroom-shaped enlarged head (14). The unit may be combined with the functions of a spark plug by extending a conductor therethrough, making the pick-up of electrically conductive glass or ceramic, placing a metal foil or other conductor at the outside, separated from the metallic housing by an insulating sleeve or the like.

19 Claims, 6 Drawing Figures

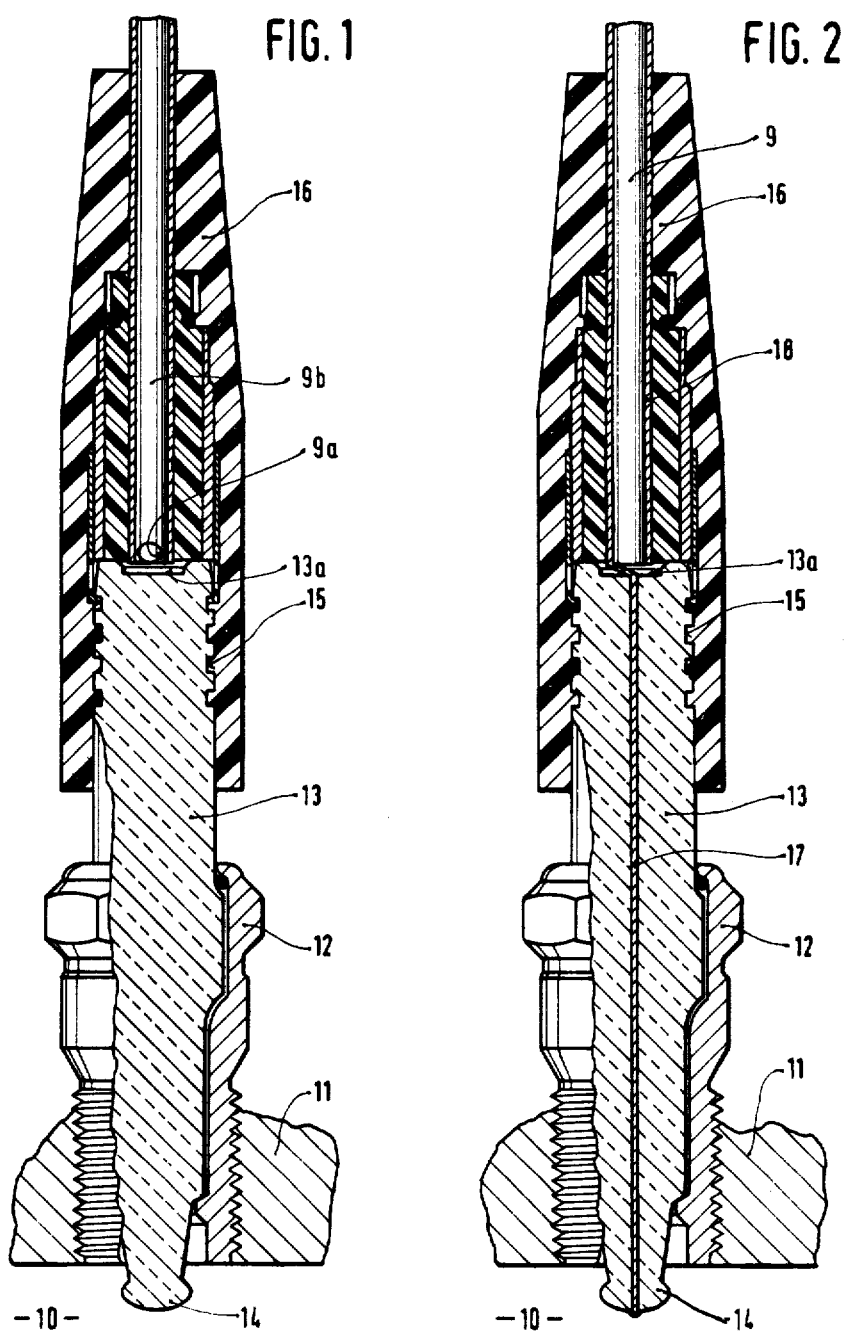

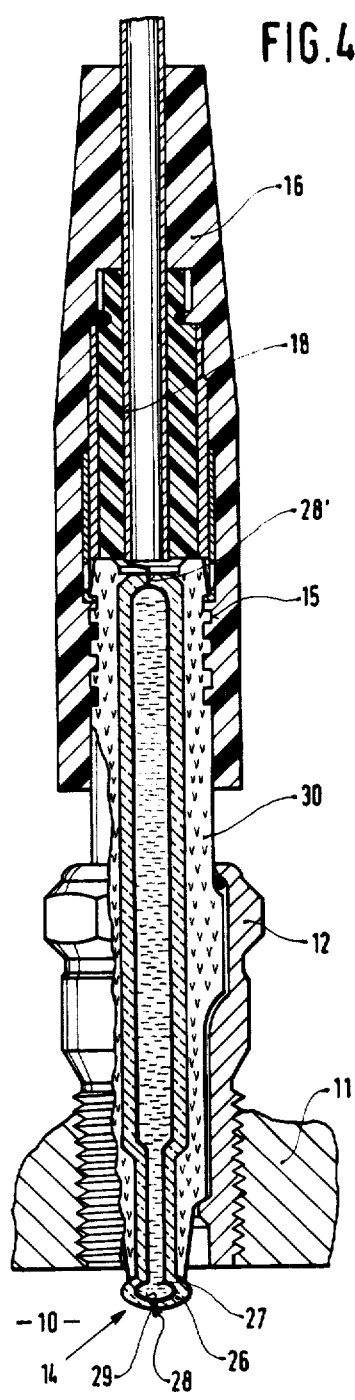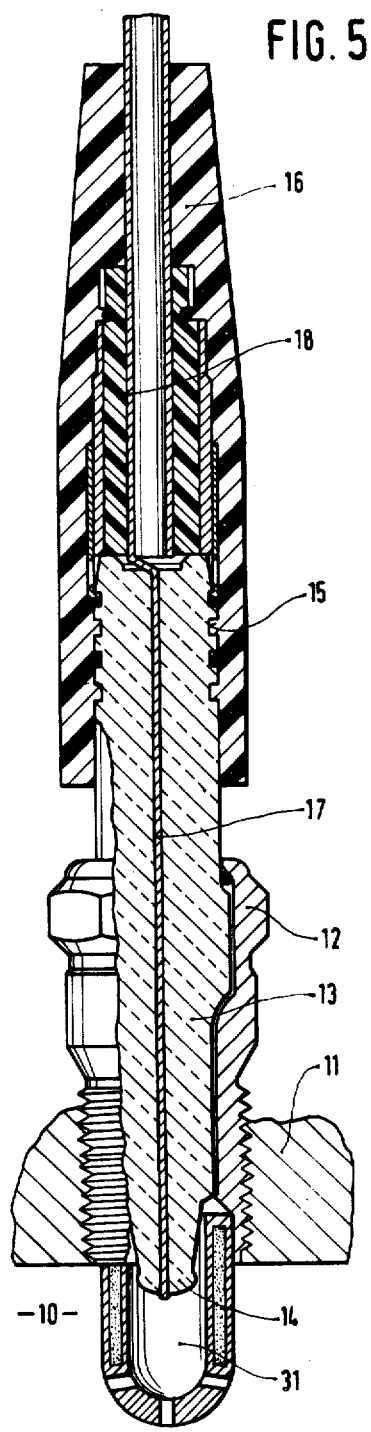

OPTICAL COMBUSTION SENSOR, PARTICULARLY FOR USE WITH INTERNAL COMBUSTION ENGINES

Reference to related application, assigned to the assignee of this invention, the disclosure of which is hereby incorporated by reference: U.S. Ser. No. 06/214,481, filed Dec. 9, 1890, MULLER, LINDER and MAURER (German P No. 30 01 711).

The present invention relates to an optical combustion sensor to sense the progress of combustion in a confined combustion chamber, and more particularly to optically sense combustion within the combustion space of the cylinder of an internal combustion engine.

The present invention also relates to a combustion process observation element, and more particularly to the constructional features of such an element to permit its association with a housing structure, for example the cylinder block of an internal combustion engine, to permit observation of the combustion occurring during operation of the engine. The element is particularly suitable to detect unusual combustion conditions, for example upon knocking of the engine, or incipient knocking.

BACKGROUND

It is desirable, frequently, to monitor combustion processes occurring in internal combustione engines, which may be of the Otto type or of the Diesel type, and which use light sensitive elements, which may be supplied with light through a light guide to permit viewing of the actual combustion processes which occur upon ignition of an air-fuel mixture within the combustion chamber of the engine. Preferably, the combustion process should be monitored with respect to time, so that it can be monitored during actual operation of the engine, as the piston within the cylinder reciprocates. Observation may, for example, extend to the temporal and geometric distribution of the flame occuring during combustion; sensing of the ignition instant, sensing of fuel injection or fuel supply process; and, especially, sensing of undesirable or irregular combustion processes.

Irregular combustion may lead to knocking of the engine, Such knocking occurs under certain operating conditions. Knocking, as usually understood, is caused by oscillations within the audible frequency band of the compressed fuel-air mixture which is triggered by a shock wave. The heat transmission to the piston walls and the cylinder walls of the engine is substantially increased during such oscillations. A thermal overload of the surfaces will result, so that knocking should be avoided. For most efficient operation of the engine, however, it is desirable to utilize the working range of the engine to the greatest possible extent and, therefore. the engine should be operated just below the "knocking limit". It is necessary then to have some means which clearly and reliably indicate knocking, or a tendency to knock, so that the operating parameters of the internal combustion (IC) engine can then be so controlled that the engine will operate just below the knocking limit.

Various types of sensors to determine knocking have been proposed. Mechanical systems which sense the transferred oscillations to the engine, for example using a piezoelectric sensor, are easily made but have the disadvantage that such systems are difficult to operate reliably and free from interference and stray signals, since they also may respond to externally generated jolts and oscillations which arise in the operation of a vehicle to which the engine may be coupled, for example over bad roads or corrugated roads.

It has also been proposed to sense and observe the combustion process by optical means. An optical sensor and background literature are described in the cross-referenced application, assigned to the assignee of the present application, Ser. No. 06/214,481, filed Dec. 9, 1980, MULLER et al. This application discloses a sensor which include light guide fibers or filaments which are positioned to sense the combustion event optically, the light guides being connected to a photoelectric transducer which, in turn, provides output signals to a tuned or filter circuit which is responsive to or tuned to expected knocking frequency to provide an output signal if shock waves occurring within the combustion chamber are of a frequency which results in engine knocking. Of course, the signals derived from the photoelectric transducer can be processed in any desired manner. The aforementioned patent application further describes integration the light guide with a spark plug of an internal combustion engine; or to place light guides in the cylinder head gasket or seal, for eventual connection to photoelectric transducers.

Sensing physical parameters occurring with the combustion chamber of an IC engine by optical means causes problems: The optical element which faces the combustion, chamber, for example a glass rod, a fiber cable, or the like, will become dirty or blackened during operation, particularly upon extended operation, so that effective output and suitable measuring and evaluation of the light output becomes difficult, and in a limiting case even impossible after some operating time. Various proposals have been made to keep the side of the light guide facing the combustion chamber clean, or to so position and shape that portion of the light guide that it will be subjected to flushing action by induced fuel, swirling air-fuel gases, and the like, to thereby maintain the optical transmissivity thereof.

The optical elements of sensors exposed to the combustion chamber itself can become dirty or have deposits accumulate thereon which interfere with proper optical sensing of the combustion events.

THE INVENTION

It is an object to provide a sensor structure which has an optical sensing portion so constructed that contamination thereof by deposits arising upon combustion are minimized, and which is largely self-cleaning to maintain the operative condition of the sensor for a long period of time without maintenance.

Briefly, the sensor is generally in form of a spark plug, that is, has an outer housing similar to a spark plug, and may, indeed, be combined with the electrical components of a spark plug. A light pick-up element, such as a light guide rod, is centrally positioned in the housing and has a sensing end portion optically exposed to the combustion chamber. In accordance with the invention, the sensing end portion of the light pick-up means is mushroom-shaped, that is, formed with an enlarged, thickened head at its terminal end.

The arrangement in accordance with the invention has the advantage that, surprisingly, the enlarged head is resistant to contamination so that, even for long operating times, the light transmitted by the sensor will have high intensity levels for a long operating time.

In accordance with a preferred embodiment of the invention, the sensor can be combined with a spark plug by combining the optical sensing portion with a center electrode of customary type in a spark plug, or by applying a conductive track to a center electrode, so that a single plug unit can be used both as an optical sensor and as a spark plug.

The sensor, particularly when combined with a spark plug, will be exposed to considerable heating. In accordance with a feature of the invention, which forms a preferred embodiment, the housing includes a hollow chamber which retains a medium subject to evaporation and recondensation, so that the sensor inherently includes a heat pipe which transmits heat from the sensor portion exposed to high temperatures of combustion to an external portion thereof where cooler ambient temperatures prevail. This arrangement is particularly suitable to prevent spontaneous combustion or undesired ignition of the fuel-air mixture in an Otto-type engine, also referred to, colloquially, as "Dieseling".

DRAWINGS

FIG. 1 is a schematic longitudinal, part cross-sectional, part pictorial illustration of a sensor with a massive transparent light-transmitting element of glass or ceramic;

FIG. 2 is an illustration similar to FIG. 1 with a center electrode;

FIG. 4 is a schematic longitudinal part cross-sectional, part pictorial illustration of the sensor with a heat pipe; and FIG. 5 is another illustration of the sensor with an antechamber or pre-ignition chamber.

Figure 3A:
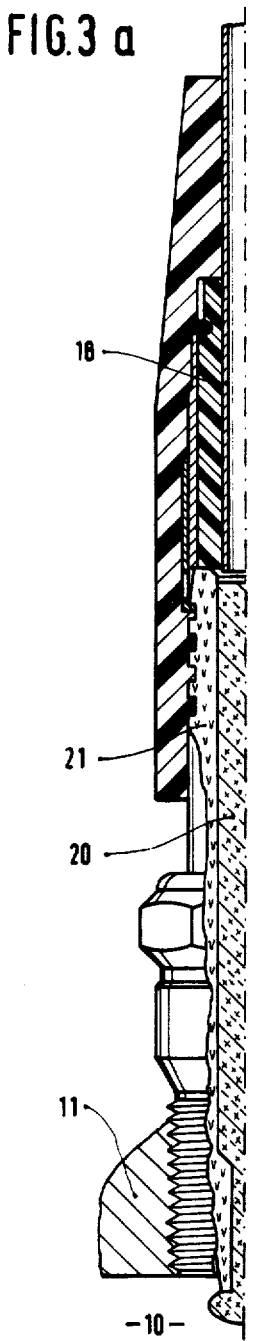
FIG. 3a and FIG. 3b illustrate further embodiment with a centrally, optically transparent body, surrounded by an insulating ceramic element to insulate an electrical conductor with respect to a metallic outer housing.

The combustion chamber, for example the cylinder head portion of an internal combustion (IC) engine, is generally indicated at 10, defined on one side by a cylinder head 11. A housing 12, similar to a customary and standard spark plug housing, is screwed into a tapped opening in the cylinder head 11. The housing 12 has a massive central transparent body 13, made of glass or transparent ceramic, centrally positioned therein.

In accordance with the invention, the end portion of the body 13 which is exposed to the combustion chamber 10 is formed with a mushroom-shaped enlargement 14, so that the body 13 terminates in a thickened end head. Light generated as a result of combustion in chamber 10 is picked up by the pick-up formed by the body 13 with the mushroom-shaped enlarged head 14, and transmitted to the end thereof remote from the combustion chamber 10. The light which is picked up and so transmitted can be evaluated in various ways, as well known. As illustrated in FIG. 1, an opto-electrical transducer 9a is located at the end portion 13a of body 13, and electrically connected to an electrical cable 9b for transmission to an evaluation circuit as well known. In another form of the invention, a light guide cable 9 is placed in direct contact with the end portion or end face 13a of body 13 for transmission of optical signals to an evaluation unit which, then, can retain an opto-electrical coupler therein.

The cable 9, or 9b, as the case may be, as well as the transducer 9a in the embodiment of FIG. 1, are retained in contact with the end portion or end face 13a of body 13 by a suitable holder plug 16, made of plastic or rubber or the like, and retained on the outer surface of the body 13 by interengagement of ribs and intervening grooves, as well known, and shaped in any suitable form. The grooves and ribs may be spiraled, if desired. The outer surface of body 13 may be coated with a protective opaque coating, or the metallic housing 12 can be extended upwardly for engagement of the sleeve-formed socket 16 thereover. The ceramic or glass body 13 is held in the metallic housing by shoulders formed thereon, and retained for example by a resilient O-ring within a groove in the housing 12 which is subsequently rolled over the ring to provide a tight holding and sealing connection. Various other heat compensating shims or other expansion elements, well known in the field of applying plugs through a cylinder head, have been omitted for clarity of the drawing and can be used as required.

The thickened head 14, formed, in accordance with the invention, at the combustion end portion of the pick-up body 13, is particularly resistant to contamination or to being coated or covered with dirt or soot. It is believed that this resistance to contamination is due to a washing action of freshly introduced air-fuel mixture which is sucked in during each suction stroke, so that the air-fuel mixture flow past the thickened head has the tendency to wash clean the surface of the thickened head during the suction stroke and further due to resulting turbulence of the fuel-air mixture as it is being compressed during the subsequent compression stroke of an automotive engine.

Embodiment of FIG. 2: The self-cleaning effect is enhanced in the combination arrangement in accordance with FIG. 2 in which a center electrode 17 is additionally provided. The central electrode 17 is passed through a center opening of the transparent glass or ceramic body 13, and terminates outside of the mushroom-shaped enlargement 14. The electrode 17 is electrically connected to a high-tension connection 18 retained within the sleeve or plug 16. The high-tension connection may be added, for example, in form of an outer jacket, a braid, or the like, surrounding the light guide cable 9. The jacket 18 is electrically connected to the center electrode 17, for example by soldering or the like.

The arrangement of FIG. 2 is a combined sensor and spark plug, so that a single plug can be used to initiate controlled external ignition, and to sense the resulting light due to combustion of the fuel-air mixture. The spark from the spark plug will follow the surface of the hot mushroom-shaped enlargement 14 and, upon each combustion, burns off residue and contaminants which may have become deposited on the head 14. Of course, the metal body 12 is grounded or connected to chassis through the metallic cylinder head 11, and the spark will jump over between the tip of conductor 17 and the next adjacent surface at ground or chassis or reference potential. Each ignition event will have the tendency to form a new exposed duct or track extending over the glass or ceramic body 213 to thereby expose the glass or ceramic 213 at the enlarged mushroom-shaped head 14.

The arrangement of FIG. 2 has the further advantage that, due to the customary location of spark plugs at optimum accessibility to the fuel-air mixture during compression, ignition is reliably initiated while, simultaneously, cleaning of the enlargement 14 is insured. Firing of the fuel-air mixture is optimized since the spark can jump over the mushroom-shaped enlargement 14 at any random position and, in accordance with the physics of breakdown phenomena, will occur at that point at which the air-fuel mixture is most easily ionized. This contributes to efficient and optimum combustion of the compressed fuel-air mixture within the cylinder head of the IC engine.

Figure 3B:
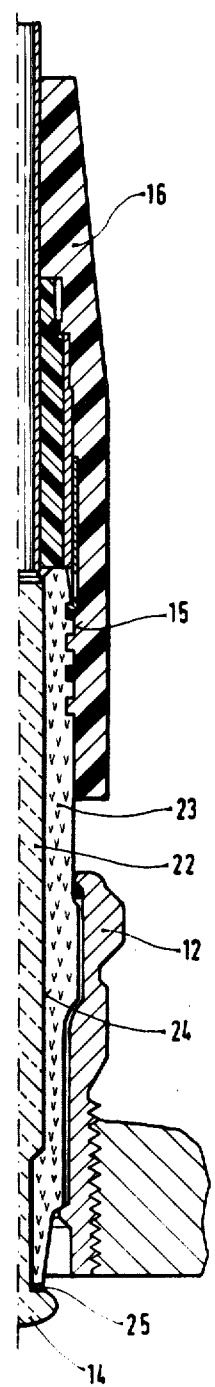

FIG. 3—collectively, in two separate illustrations FIGS. 3a, 3b, illustrates further embodiments of the sensor. The two illustrations of FIG. 3 have in common that a separating ceramic element 21, 23, at the outside, surrounds the transparent glass or ceramic body 20, 22 which forms the actual light pick-up. The ceramic body 21, 23 is retained within the housing 12 and surrounded at its outside by the sleeve or socket 16.

In the embodiment of FIG. 3a, illustrating the left half-section of a spark plug, the material of the transparent glass or ceramic body 20 is rendered conductive by a metallic additive, for example copper, iron, platinum, or the like. The glass or ceramic body 20 thus forms, simultaneously, an electrical conductor for ignition voltage, and an optical conductor for the light signal which will result as a consequence of ignition. The electrically conductive light guide or light pick-up 20 is connected to a jacketed ignition cable 18, as in FIG. 2, for example.

In the embodiment of FIG. 3b, which shows the right half-section, the transparent glass or ceramic body 22 is of insulating material, and an electrical conductor is formed by a conductive track or layer, or surrounding coating 24, at the outer side of the glass or ceramic body 22, separated from the metallic housing 12 by the intervening ceramic element 23 which, normally, will be opaque. The conductive track or conductor 24 may be formed in various ways; for example, it may be in form of a foil, a metallic braid, or the like, or an outer metallic coating. The conductive track or conductive path 24 terminates in a metallic ring 25 which is located between the end portion of the electrically insulating ceramic body 23 and the mushroom-shaped enlargement 14. Of course, the ring 25 may also be located at other portions of the head 14 and the electrical connection 24 suitably extended thereto.

Embodiment of FIG. 4: The operating temperature in the combustion chamber of an IC engine can reach very high levels. It is thus possible that the mushroom-shaped thickened head 14 reaches temperatures which can induce spontaneous ignition in the engine. Cooling of the head 14 can be carried out, in accordance with the feature of the invention, by forming the glass or ceramic body 26 with an internal chamber 27 and constructing a light pick-up in form of a transparent heat pipe. A heat pipe, as well known, includes a heat conductive medium therein, for example sodium or mercury, which is liquid when in contact with the hot region of the heat pipe, is vaporized therein, and the vapor condenses to a liquid in the colder region thereof, for recirculation to the hot part, vaporization and so on, to form a closed heat transfer cycle. The heat pipe in the structure of the present invention is so arranged that the medium will vaporize in the region of the mushroom-shaped enlargement 14 and can condense at the side of the body 26 which is close to the connecting socket 16, that is, outside of the cylinder head and remote therefrom. High-tension electric power can be applied in this embodiment, also, to the end of the body 26 by placing a center electrode 28 at the tip end of the head 14, and a counter electrode 28' at the remote or cool end. The heat pipe medium of mercury or sodium is electrically conductive and thus can form the electrical connection between cable 18 and the tip 28 on the enlarged head 14. If this electrical conduction is insuffient, an inner metallization 29 can also be applied to insure electrical contact and connection between the combustion chamber terminal 28 and the inner connecting terminal 28'. Electrode 28' is electrically connected to the cable 18.

The body 26 can be formed as a composite, that is, a metal core with glazing thereon, or a braid of glass fibers applied thereover. It is also possible to form the separating ceramic sleeve 30 of a transparent material, such as a transparent ceramic or glass, in which case body 26 can be made of metal, without a transparent covering. Optical sensing then is provided by the light transmission through the then transparent separating sleeve or separating body 30, which picks up light from combustion arising in the combustion chamber 10. In a preferred form, however, the head 14 should then be covered with a transparent glaze or the like, leaving exposed electrode 28, in light-transmissive contact with the light-transmitting 30 to insure that the area of the sensor which is effectively and optimally clean, in operation, will be in light-transmissive connection with the light-transmitting element 30.

Embodiment of FIG. 5: Any one of the structures of FIGS. 1-4 can be additionally modified by placing the mushroom-shaped enlargement within a pre-ignition or antechamber 31. FIG. 5 illustrates, generally, the embodiment of FIG. 2, but the placement of a covering or pre-ignition chamber structure can be used with any one of the other embodiments as well.

The wall structure of the antechamber 31 can be in accordance with any well known and suitable design of pre-ignition chambers, for example a metallic structure which has an insulated side portion, that is, a hollow inner wall which is filled with a granular heat resistant material. Suitable openings are provided to insure circulation of fuel-air combustion mixture into the chamber, and removal of combustion gases therefrom.* Light arising upon firing of the air-fuel gas mixture within the pre-ignition chamber will be sensed by the mushroom-shaped enlargement 14 of the body 13. Of course, light from the resulting further combustion in combuation chamber 10 will likewise be transmitted to head 14 and body 13 through the openings in the pre-ignition chamber, only three of which are shown for simplicity of representation.

*Such structures are described in German disclosure document DE-OS-No. 27 15 943, corresponding to pending U.S. patent application, Ser. No. 141,506 of Apr. 18, 1980 and are well known in the art.

Various changes and modifications may be made, and features described in connection with any one of the embodiments may be used with any of the others, within the scope of the inventive concept.

We claim:

1. Optical sensor arrangement to obtain an optical signal representative of combustion light in a combustion chamber (10), particularly a combustion chamber of an internal combustion engine, having an tubular housing (12) formed with means for securing the housing in a wall (11) defining said combustion chamber at one side thereof;

light-responsive means (9, 9a) retained in the housing;

and light pick-up means (13, 20, 22, 26) retained in the housing having a sensing end portion in communication with the combustion chamber at one end and being optically coupled to the light responsive means at the other end, and wherein, in accordance with the invention, the sensing end portion of the light pick-up means is mushroom-shaped and formed with an enlarged thickened head (14) at the terminal end.

2. Arrangement according to claim 1, wherein said housing is a spark plug-type housing, and cable means (9b, 18) are provided formed with a terminal connecting sleeve or socket (16) engageable with the spark plug-type housing.

3. Arrangement according to claim 2, wherein said pick-up comprises a centrally positioned metallic element formed with said mushroom-shaped enlarged head, and an electrically insulating, optically transparent body surrounding said centrally located matallic element.

4. Arrangement according to claim 3, wherein said electrically insulating optically transparent body comprises optically transparent ceramic.

5. Arrangement according to claim 3, wherein said electrically insulating optically transparent body comprises an optically transparent glaze on said metallic element.

6. Arrangement according to claim 5, wherein said electrically insulating optically transparent body comprises a glass fiber braid.

7. Arrangement according to claim 5 or 6, further including an electrically insulating ceramic separating sleeve surrounding the electrically insulating optically transparent body.

8. Arrangement according to claim 3, wherein said centrally positioned metallic element is a hollow element defining a chamber (27) therein;
a vaporizable and condensable medium positioned within said chamber (27) to form a heat pipe for cooling the enlarged head (14) and transferring heat from the sensing end portion to the other end.

9. Arrangement according to claim 1, further including a projecting structure defining a pre-ignition or antechamber (31) secured to said housing and positioned to extend over said mushroom-shaped enlarged head (14).

10. Arrangement according to claim 1, wherein said pick-up means comprises a transparent body of glass or ceramic (13, 20, 22, 26) having said thickened head (14) integrally formed therewith at the sensing end portion.

11. Arrangement according to claim 10, further including a center electrode (17) positioned in said transparent body.

12. Arrangement according to claim 10, further including (FIGS. 3, 4) an electrically insulating ceramic sleeve-like body (21, 23) and insulating said transparent glass or ceramic body (20) with respect to the housing (12).

13. Arrangement according to claim 12, wherein said transparent glass or ceramic body comprises an electrically conductive glass or ceramic including metal additives.

14. Arrangement according to claim 13, wherein the metal additives comprise one of the materials of the group consisting of: copper, iron, platinum.

15. Arrangement according to claim 12, further including a conductive path (24) formed on the outer surface of the glass or ceramic transparent body (22), said electrically insulating sleeve-like ceramic body separating the conductive path from the housing.

16. Arrangement according to claim 15, wherein said conductive path comprises at least one of the materials of the group consisting of: a foil; a metal braid; a metalizing coating or layer.

17. Arrangement according to claim 15, further including a metal ring (25) located beneath the mushroom-shaped enlarged head (14) and in electrically conductive connection with the electric path.

18. Arrangement according to claim 1, wherein said pick-up means comprises a hollow body (26), and a heat conductive vaporizable and condensable medium is located within the chamber (27) defined within said hollow body to form a heat pipe and conduct heat from the sensing end thereof to the other end, and thereby cool the sensing end.

19. Arrangement according to claim 18, including an inner metallic conductive path (29) located inside of the chamber defining the heat pipe;
an ignition center electrode (28) extending through the mushroom-shaped enlarged head (14) at the sensing end portion of the pick-up;
and a connecting electrode (18') positioned at the other end thereof.

* * * * *